United States Patent [19]

Kay

[11] Patent Number: 4,537,154
[45] Date of Patent: Aug. 27, 1985

[54] SAFETY VEST OR HARNESS FOR PETS OR SMALL CHILDREN

[76] Inventor: Fern Kay, 52 Yatesbury Rd., New York, Ontario, Canada, M2H 1E9

[21] Appl. No.: 520,928

[22] Filed: Aug. 8, 1983

Related U.S. Application Data

[63] Continuation-in-part of Ser. No. 390,498, Jun. 21, 1982, abandoned.

[30] Foreign Application Priority Data

Jun. 20, 1983 [CA] Canada ............................. 430778

[51] Int. Cl.³ .......................................... A62B 35/00
[52] U.S. Cl. .................................... 119/96; 182/3
[58] Field of Search ............... 119/96; 182/3; 54/71, 54/79

[56] References Cited

U.S. PATENT DOCUMENTS

| | | | |
|---|---|---|---|
| 1,193,374 | 8/1916 | Gilliam | 272/1 R X |
| 1,508,601 | 9/1924 | Huff | 119/96 |
| 1,930,378 | 10/1933 | Beagan | 119/96 |
| 2,170,703 | 8/1939 | Waxman et al. | 119/96 |
| 2,704,428 | 3/1955 | Sessler | 119/96 |
| 4,026,245 | 5/1977 | Arthur | 119/96 |
| 4,159,010 | 6/1979 | Mitro | 119/96 |
| 4,273,215 | 6/1981 | Leggett | 119/96 |
| 4,303,041 | 12/1981 | Thompson et al. | 119/96 |

Primary Examiner—Hugh R. Chamblee
Attorney, Agent, or Firm—Robert F. Delbridge; Arne I. Fors

[57] ABSTRACT

An animal or child harness suitable for pets such as dogs, cats or monkeys or for small children, has a panel of flexible material shaped to pass around the underneath of the body of the animal or child from one side to the other and to extend over a substantial part of the length of the body in a front to rear direction. Front releasable securing devices extend from opposite sides of the panel adjacent the front for passing laterally across the top of the body of the animal or child behind the neck. Rear releasable securing devices extend from opposite sides of the panel adjacent the rear for passing laterally across the top of the body of the animal or child near the rear. A strap extends between the forward releasable securing devices and the rear releasable securing devices so as to extend above the back of the animal or child in a front to rear direction.

7 Claims, 5 Drawing Figures

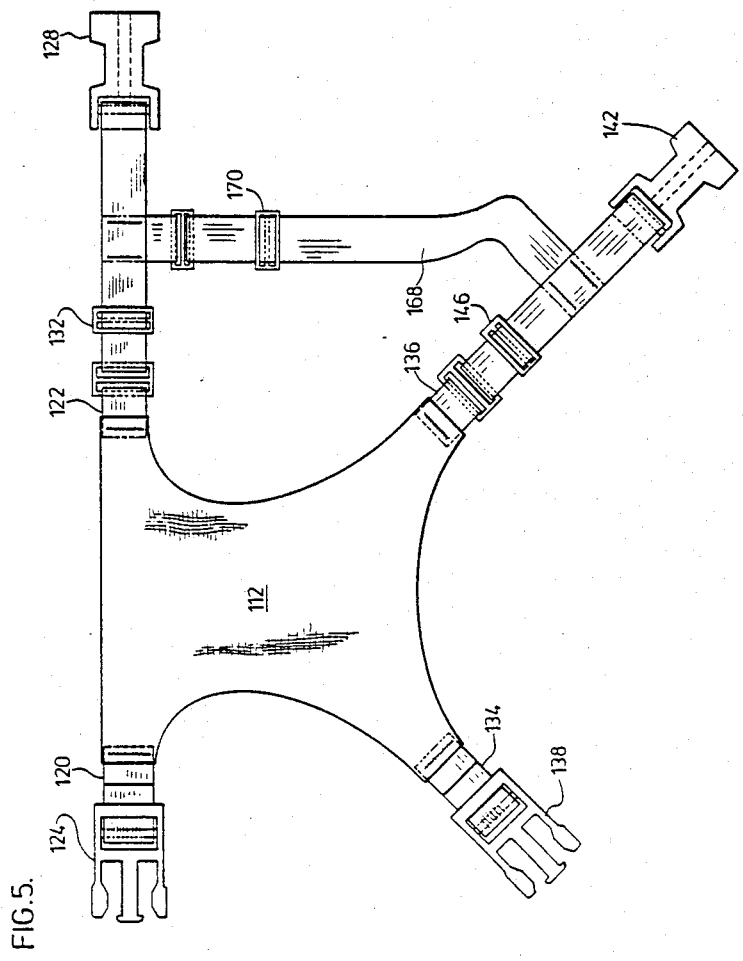

SAFETY VEST OR HARNESS FOR PETS OR SMALL CHILDREN

This is a continuation-in-part of application Ser. No. 390,498 filed June 21, 1982 now abandoned.

This invention relates to animal or child harnesses suitable for pets such as dogs, cats or monkeys or for small children.

It is advisable and in many places compulsory for automobile drivers and passengers to wear seat belts when driving so that almost every present-day automobile is fitted with seat belts in the front and rear seats, such seat belts being of the lap and/or diagonal kind. The reasons for the use of seat belts by drivers or passengers also applies to pets such as dogs, mainly for adequate restraint if an accident occurs. However, a dog clearly cannot use a conventional seat belt intended for use by a driver or passenger. A harness wearable by a dog and securable to a conventional seat belt in an automobile has been proposed in U.S. Pat. No. 3,310,034 (Dishart) issued Mar. 21, 1967, but this known harness does not permit adequate mobility for a dog during driving, and also the nature of the harness is such that the dog may easily be injured by the harness if an accident occurs and the dog is thrown forwardly.

It is therefore an object of the invention to provide an improved harness suitable for dogs, cats or monkeys which is attachable to a conventional automobile seat belt in a manner which will safely restrain the animal if an accident occurs and which, at the same time, gives the animal a reasonable amount of mobility during normal driving. It is also an object of the invention to provide such a harness which is suitable for small children.

According to the present invention, a harness comprises a panel portion of flexible material shaped to pass around the underneath of the body of the animal or child from one side to the other and to extend over a substantial part of the length of the body in a front to rear direction, front releasable securing means extending from opposite sides of the panel portion adjacent the front thereof for passing laterally across the top of the body of the animal or child behind the neck, rear releasable securing means extending from opposite sides of the panel portion adjacent the rear thereof for passing laterally across the top of the body of the animal or child near the rear thereof, and strap means extending between the forward releasable securing means and the rear releasable securing means, so as to extend above the back of the animal or child in a front to rear direction. The strap means may be adjustable in length.

Thus, an animal or child wearing a harness in accordance with the invention may be safely restrained in an automobile, while still allowing a reasonable amount of mobility, by passing a conventional automobile seat belt, whether of the lap or diagonal kind, between the strap means of the harness and the upper part of the body of the animal or child. The harness of the present invention may also be used for carrying the animal, with the strap means providing a carrying handle for this purpose.

The releasable securing means may be adjustable to conform the size of the harness to the girth of the body of the animal or child. Each releasable securing means may comprise a pair of laterally-extending straps extending from opposite sides of the main panel portion, and a two-part releasable securing device with one part being carried by one strap and the other part being carried by the other strap.

The strap means may extend between one part of the front releasable securing device and a corresponding part of the rear releasable securing device.

The main panel may also have at least one aperture through which the front legs or arms of the animal or child can pass.

A first connecting portion may extend between one strap of the first releasable securing means and a corresponding strap of the rear releasable securing means, a second connecting portion extends between the other strap of the first releasable securing means and the other corresponding strap of the rear releasable securing means, and at least one intermediate strap extends between the main panel portion and an adjacent connecting portion. The laterally-extending straps and the intermediate straps may be adjustable in length to conform the size of the harness to the girth of the body of the animal or child.

Embodiments of the invention will now be described by way of example, with reference to the accompanying drawings, of which:

FIG. 5 is a plan view of a dog harness in accordance with a further embodiment.

Figure 1:
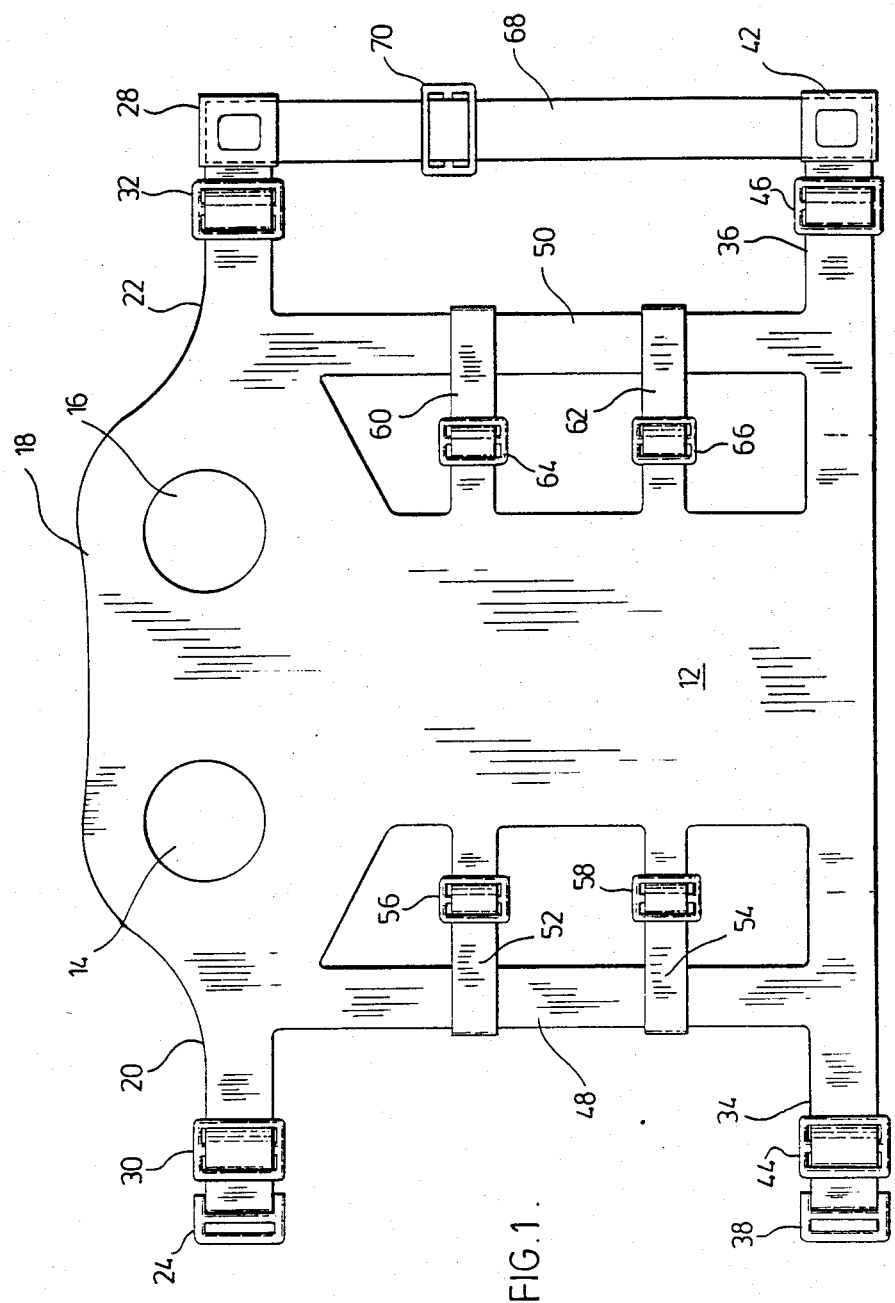
FIG. 1 is a plan view of a dog harness according to one embodiment.
Figure 2:
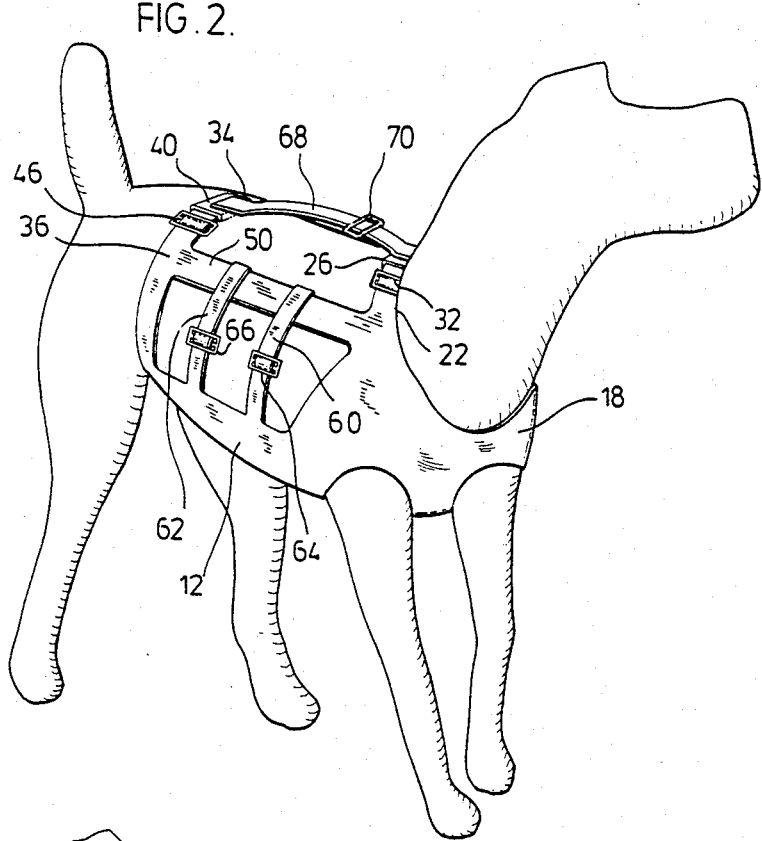
FIG. 2 is a side view showing the harness fitted on a dog.
Figure 3:
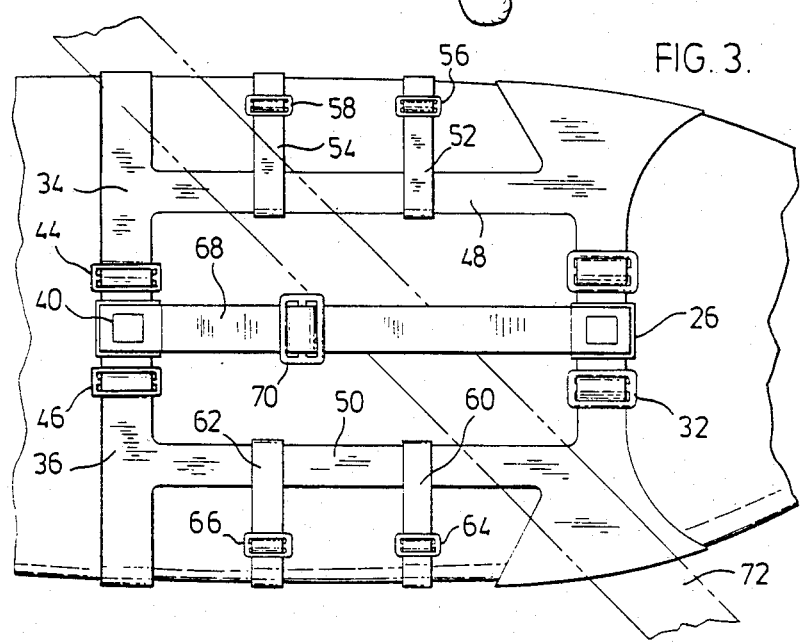
FIG. 3 is a plan view of the harness and dog of Figure.

Referring to the drawing, FIGS. 1 to 3 show a dog harness comprising a main panel portion 12 of light-durable flexible material, such as nylon, having a pair of laterally spaced apertures 14, 16 adjacent the front end for receiving a dog's legs, with the front end of the main panel portion 12 thereby providing a wide band portion 18 which passes around the dog's body in front of its front legs, without contacting its throat.

A pair of front connecting straps 20, 22 extend laterally from opposite sides of the main panel portion 12 near its front end. The strap 20 is attached to one part 24 of a two-part securing device 26, and the strap 22 is attached to the other part 28 of the securing device 26, which is similar in construction to known quick-release seat belt securing devices. Each strap 20, 22 passes through an aperture in respective securing part 24, 28, with the free end of each strap 20, 22 being attached to a length adjuster 30, 32 respectively slidably attached to the strap 20, 22 in a manner known per se.

Similarly, a pair of rear connecting straps 34, 36 extend laterally from opposite sides of the main panel portion 12 at its rear end. The strap 34 is attached to one part 38 of a two-part securing device 40, and the strap 36 attached to the other part 42. Each strap 34, 36 passes through an aperture in a respective securing part 38, 42, with the free end of each strap 34, 36 being attached to a length adjuster 44, 46 respectively slidably attached to the strap 34, 36 in a manner known per se.

A connecting portion 48 extends between the forward strap 20 and the rear strap 34, and a connecting portion 50 extends between the front strap 22 and the rear strap 36. Two longitudinally-spaced intermediate straps 52, 54 extend from an upper edge of the main panel portion 12 between the front and rear straps 20, 34 with the intermediate 52, 54 passing around the connecting portion 48 and carrying length adjusters 56, 58 on their free ends slidably attached to the straps 52, 54.

Similarly, two longitudinally spaced intermediate straps 60, 62 extend from the upper edge of the main panel portion 12 between the front and rear straps 22, 36 with the intermediate straps 60, 62 passing around the connecting portion 50 and carrying length adjusters 64, 66 on their free ends slidably attached to the straps 60, 62.

A longitudinal strap 68 extends forwardly from one of the parts of the rear securing device 40 and passes through an aperture in the corresponding part of the front securing device 28, with the free end of the strap 68 being secured to a length adjuster 70 slidably attached to the strap 68.

Referring especially to FIGS. 2 and 3, the harness is fitted to a dog by passing the dog's front legs through the apertures 14, 16 so that the main panel portion 12 engages the underneath and sides of the dog's body between its front and rear legs, with the wide band portion 18 extending around the dog's body in front of its front legs, without touching its throat. The front straps 20, 22 are then fastened together across the dog's back by means of the securing device 28, and the rear straps 34, 36 are similarly fastened together by means of the securing device 40. The various length adjusters are then adjusted to ensure that the harness is a snug fit around the girth of the dog's body. It will be noted that it is only necessary to make such adjustment the first time that the harness is fitted onto a particular dog. Thus, the harness can be fitted or removed by operation of the two quick-release securing devices 28, 40.

When a dog wearing the harness has been positioned on the rear seat of a car, a conventional lap or diagonal seat belt 72 is passed between the longitudinal strap 68 and the dog's back, as shown in FIG. 3, so that the dog has a reasonable amount of mobility while at the same time is restrained from excessive forward movement in the event of an accident.

It will also be apparent that the harness may be utilized for carrying the dog, assuming that it is light enough, by using the longitudinal straps 68 as a carrying handle.

Figure 4:
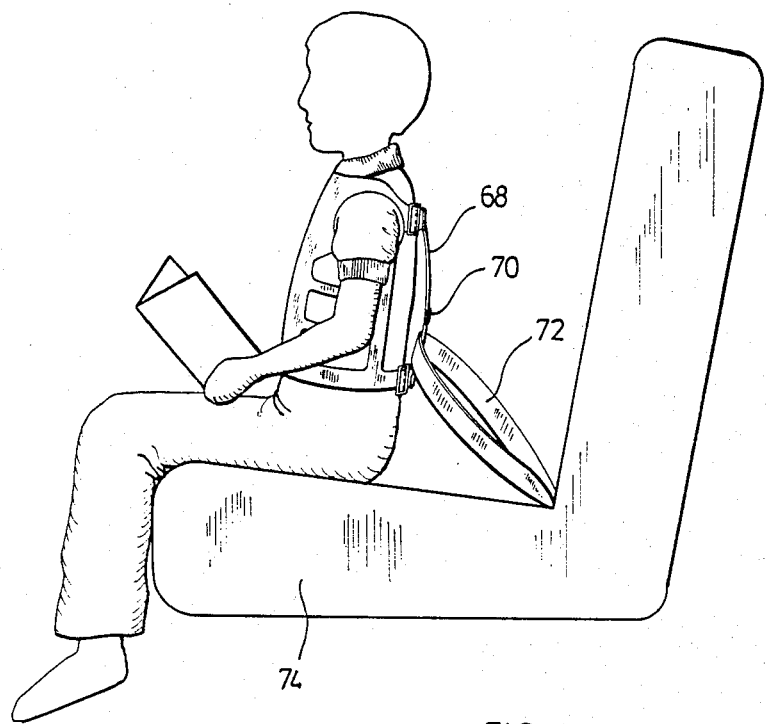
FIG. 4 is a side view of a child wearing the harness and sitting on a car seat.

The harness may also be used for restraining a child in a car, while at the same time allowing the child a reasonable amount of mobility. FIG. 4 shows a child wearing the harness in a sitting position on a car seat 74, with the car seat belt 72 passing between the strap 68 and the child's back. It will also be apparent that the child can lie down on the seat 74 if desired.

FIG. 5 shows a dog harness in accordance with a further embodiment, the harness having a panel portion 112 with a pair of first connecting straps 120, 122 extending laterally therefrom in opposite directions. The strap 120 is attached to one part 124 of a two-part securing device, and the other strap 122 is attached to the other part 128 of the securing device. The strap 120 is adjustable in length by reason of the nature of its attachment to the securing device part 124 and the strap 122 is adjustable in length by a length adjuster 132, as will be clearly apparent to a person skilled in the art. Similarly, a pair of rear connecting straps 134, 136 are provided, with the strap 134 being attached to one part 138 of a further two-part securing device, and the strap 136 being attached to the other part 143 thereof. The strap 134 is adjustable in length by reason of the nature of its attachment to the securing device part 138, and the strap 136 is adjustable in length by a length adjuster 146, again as will be readily apparent to a person skilled in the art. The front straps 134, 136 extend laterally from the panel portion 112 in forwardly inclined directions. A longitudinal strap 168 extends between the front and rear straps 122, 136 and is provided with a length adjuster 170, again as will be readily apparent to a person skilled in the art. The manner in which this harness can be used will be clear from the foregoing description.

Other embodiments of the invention will be readily apparent to a person skilled in the art, the scope of the invention being defined in the appended claims.

What I claim as new and desire to protect by Letters Patent of the United States is:

1. An animal or child harness suitable for pets such as dogs, cats or monkeys or for small children, the harness comprising a panel portion of flexible material shaped to pass around the underneath of the body of the animal or child from one side to the other and to extend over a substantial part of the length of the body in a front to rear direction, a pair of front straps extending laterally from opposite sides of the panel portion adjacent the front thereof for passing laterally across the top of the body of the animal or child behind the neck, said front straps having free end portions carrying releasable securing means to enable said front free end portions to be secured together, a pair of rear straps extending laterally from opposite sides of the panel portion adjacent the rear thereof for passing laterally across the top of the body of the animal or child near the rear thereof, said rear straps having free end portions to be secured together, and a longitudinal strap extending between a front strap and a corresponding rear strap so as to extend centrally along the back of the animal or child in a front to rear direction when the harness is secured in position, a first connecting portion extending between one front strap and a corresponding rear strap, a second connecting portion extending between the other front strap and the other corresponding rear strap, and at least one intermediate strap extending between the main panel portion and each adjacent connecting portion.

2. A harness according to claim 1 wherein the longitudinal strap is adjustable in length.

3. A harness according to claim 1 wherein the front and rear releasable securing means are adjustable to conform the size of the harness to the girth of the body of the animal or child.

4. A harness according to claim 1 wherein said at least one intermediate strap is adjustable in length to confirm the size of the harness to the girth of the body of the animal or child.

5. An animal harness suitable for pets such as dogs or cats, the harness comprising a panel portion of flexible material shaped to pass around the underneath of the body of the animal from one side to the other, and to extend over a substantial part of the length of the body in a front to rear direction, a pair of front straps extending laterally in forwardly inclined directions from opposite sides of the panel portion adjacent the front thereof for passing around the body of the animal behind the neck, said front straps having free end portions carrying releasable securing means to enable said front free end portions to be secured together, a pair of rear straps extending laterally in opposite directions from opposite sides of the panel portion adjacent the rear thereof for passing around the body of the animal near the rear thereof, said rear straps having free end portions carrying releasable securing means to enable said rear free end portions to be secured together, and a longitudinal strap extending beween a front strap and a corresponding rear strap so as to extend centrally along the back of the animal in a front to rear direction when the harness is secured in position.

6. An animal harness according to claim 5 wherein at least one of the front straps and at least one of the rear straps are adjustable in length.

7. An animal harness according to claim 5 wherein the longitudinal strap is adjustable in length.

* * * * *